(12) United States Patent
Leusenkamp (10) Patent No.: US 11,862,416 B2
(45) Date of Patent: Jan. 2, 2024

(54) HYBRID DC CIRCUIT BREAKER

(71) Applicant: EATON ELECTRICAL LTD., Suzhou (CN)

(72) Inventor: Martin Bernardus Johannes Leusenkamp, Suzhou (CN)

(73) Assignee: Eaton Electrical Ltd., Suzhou (CN)

( * ) Notice: Subject to any disclaimer, the term of this patent is extended or adjusted under 35 U.S.C. 154(b) by 0 days.

(21) Appl. No.: 17/584,938

(22) Filed: Jan. 26, 2022

(65) Prior Publication Data

US 2022/0246375 A1   Aug. 4, 2022

(30) Foreign Application Priority Data

Jan. 29, 2021 (CN) .......................... 202110123898.1
Jan. 29, 2021 (CN) .......................... 202120268285.2

(51) Int. Cl.
  *H01H 33/59*   (2006.01)
  *H01H 9/54*   (2006.01)
  *H02H 3/087*   (2006.01)

(52) U.S. Cl.
  CPC .......... *H01H 33/596* (2013.01); *H01H 9/542* (2013.01); *H02H 3/087* (2013.01); *H01H 2009/544* (2013.01)

(58) Field of Classification Search
  CPC ....... H01H 33/596; H01H 9/542; H02H 3/087
  See application file for complete search history.

(56) References Cited

U.S. PATENT DOCUMENTS

| | | | |
|---|---|---|---|
| 2017/0011875 A1* | 1/2017 | Dorn .................... | H01H 33/596 |
| 2020/0403396 A1* | 12/2020 | Chen .................... | H02H 1/0007 |
| 2022/0006281 A1* | 1/2022 | Shen .................... | H01H 33/596 |

FOREIGN PATENT DOCUMENTS

| | | |
|---|---|---|
| JP | 2001067969 | 3/2001 |
| JP | 2003123599 | 4/2003 |

(Continued)

OTHER PUBLICATIONS

European Search Report for European Application 221503050.4, dated Jul. 5, 2022, 9 pages.

*Primary Examiner* — Jared Fureman
*Assistant Examiner* — Christopher J Clark
(74) *Attorney, Agent, or Firm* — Stanek Lemon Crouse & Meeks, P.A, (57) ABSTRACT

The present invention provides a hybrid DC circuit breaker, wherein the hybrid DC circuit breaker comprises: a mechanical switch connected in a first current branch; and a semiconductor switch and a forced resonant injection circuit connected in a second current branch, wherein the forced resonant injection circuit comprises a first terminal and a second terminal, the first terminal of the forced resonant injection circuit is connected to one end of the semiconductor switch, and the second terminal of the forced resonant injection circuit and the other end of the semiconductor switch are connected to two ends of the mechanical switch; wherein, when the mechanical switch is in a process of switching off, the semiconductor switch is controlled to be switched on, and at the same time the forced resonant injection circuit is controlled to inject to the mechanical switch a gradually increasing injection current in a direction opposite to that of a current in the mechanical switch, so that the current in the mechanical switch gradually decreases to zero and the current is commutated from the first current branch to the second current branch in a predetermined commutation time. The hybrid DC circuit breaker of the present invention can safely and reliably switch off a fault and load currents in either direction.

11 Claims, 7 Drawing Sheets

(56) References Cited

FOREIGN PATENT DOCUMENTS

| | | |
|---|---|---|
| JP | 2005044591 | 2/2005 |
| JP | 2014235834 | 12/2014 |
| JP | 2015115096 | 6/2015 |

\* cited by examiner

HYBRID DC CIRCUIT BREAKER

CROSS-REFERENCE TO RELATED APPLICATIONS

The present application claims priority to Chinese Patent Application No. 202110123898.1; Filed Jan. 29, 2021 and Chinese Patent Application No. 202120268285.2; Filed Jan. 29, 2021 all of which are hereby incorporated herein by reference in their entireties.

TECHNICAL FIELD

The present invention relates to the field of circuit breakers, in particular to a hybrid DC circuit breaker.

BACKGROUND ART

A DC power supply system has the problem that a fault current is difficult to cut off as lacking a zero-crossing point of voltage, In order to rapidly cut off the fault current and cause no-arc breaking of a mechanical switch, at present, provided is a hybrid DC circuit breaker, comprising a mechanical switch and a semiconductor switch and a surge arrester (also called a lightning protector, a surge protective device or a voltage surge protector) which are connected in parallel with the mechanical switch.

The basic principle of the hybrid DC circuit breaker is as follows: when the fault current (for example, a short-circuit current) occurs in a DC circuit, the mechanical switch is triggered to be switched off. In the process of switching off the mechanical switch, in order to avoid generation of an electric arc in the process of switching off the mechanical switch to the maximum, the semiconductor switch is controlled to be switched on firstly so as to enable the current to be commutated to the semiconductor switch, then the mechanical switch is switched off, then the semiconductor switch is switched off after switch-off of the mechanical switch, so that the process of rapidly breaking the short-circuit current is completed, wherein the surge arrester is used for absorbing residual electric energy in the DC power supply system.

However, by using the existing hybrid DC circuit breaker, it cannot ensure that the mechanical switch makes complete no-arc breaking and cannot determine when the semiconductor switch is switched on to enable the mechanical switch to safely and reliably switch off the fault current.

SUMMARY OF THE INVENTION

Aiming to the technical problem in the prior art, the present invention provides a hybrid DC circuit breaker, comprising:
a mechanical switch connected to a first current branch; and
a semiconductor switch and a forced resonant injection circuit which are connected to a second current branch. The forced resonant injection circuit comprises a first terminal and a second terminal, the first terminal of the forced resonant injection circuit is connected to one end of the semiconductor switch, and the second terminal of the forced resonant injection circuit and the other end of the semiconductor switch are connected to two ends of the mechanical switch respectively,
wherein when the mechanical switch is in a process of switching off, the semiconductor switch is controlled to be switched on, and at the same time the forced resonant injection circuit is controlled to inject to the mechanical switch a gradually increasing injection current in a direction opposite to that of a current in the mechanical switch, so that the current in the mechanical switch gradually decreases to zero and the current is commutated from the first current branch to the second current branch in a predetermined commutation time.

Preferably, when the current in the mechanical switch gradually decreases to zero in the predetermined commutation time, the forced resonant injection circuit is controlled to stop outputting the injection current.

Preferably, when an pitch between contacts of the mechanical switch reaches a predetermined threshold, the semiconductor switch is controlled to be turned off.

Preferably, the forced resonant injection circuit comprises: a DC power supply, powered by DC voltage on the first current branch or an external power supply to charge a DC bus capacitor; a DC bus, connected to the DC bus capacitor and used for providing a current to the forced resonant injection circuit; an inverter, supplied with a switching pulse in the current injection period to generate a square-wave periodic voltage pulse of alternating polarities; a resonant circuit, comprising an inductor and a capacitor connected in series, wherein one end of the resonant circuit is connected to an output end of the inverter, and the other end of the resonant circuit is used for outputting an alternating current with a gradually increasing amplitude; a rectification circuit, having an input end connected to the other end of the resonant circuit, and having an output end used for outputting a pulsating direct current with a gradually increasing amplitude; and an output module, having an input end electrically connected to the output end of the rectification circuit, and having an output end used as the first terminal and the second terminal of the forced resonant injection circuit, and the output module is used for filtering and amplifying the pulsating direct current and outputting the injection current; wherein an equivalent resistor, an equivalent inductor and an equivalent capacitor of the inverter, the resonant circuit and a circuit connected between the other end of the resonant circuit and the output end of the inverter form an underdamped resonant circuit, and a frequency of the square-wave periodic voltage pulse depends on a resonant frequency of the underdamped resonant circuit.

Preferably, the semiconductor switch is a bidirectionally controllable semiconductor switch. The hybrid DC circuit breaker further comprises a polarity module connected between the rectification circuit and the output module; and the polarity module comprises a full-bridge circuit which is controlled to change polarities of an input current and an output current of the polarity module.

Preferably, the inverter is a single-level, double-level or multi-level full-bridge inverter or half-bridge inverter.

Preferably, the output module is configured to generate switch-off of a current between the input end of the output module and the first current branch.

Preferably, the output module is an autotransformer comprising a first winding and a second winding; a first terminal of the first winding is electrically connected to a first output terminal of the rectification circuit; a second terminal of the first winding is electrically connected to a first terminal of the second winding and serves as a first output terminal of the forced resonant injection circuit; and a second terminal of the second winding is electrically connected to a second output terminal of the rectification circuit and serves as a second output terminal of the forced resonant injection circuit.

Preferably, the transformer or the autotransformer is coreless.

Preferably, the polarity module comprises: a first switching transistor and a second switching transistor, connected to form a first bridge arm, wherein a first node formed by connecting the first switching transistor and the second switching transistor serves as a first polarity terminal; and a third switching transistor and a fourth switching transistor, connected to form a second bridge arm, wherein a second node formed by connecting the third switching transistor and the fourth switching transistor serves as a second polarity terminal; wherein a first electrode of the first switching transistor and a first electrode of the third switching transistor are connected to a positive output terminal of the rectification circuit, and a second electrode of the second switching transistor and a second electrode of the fourth switching transistor are connected to a negative output terminal of the rectification circuit.

Preferably, the hybrid DC circuit breaker further comprises a surge arrester connected in parallel with the semiconductor switch.

In the normal power supply process of the DC power supply system, the power consumption of the forced resonant injection circuit of the present invention is zero. When the fault current occurs in the DC power supply system, the forced resonant injection circuit controllably injects the gradually increasing injection current with the direction opposite to that of the current into the mechanical switch, so that the current commutation time can be controlled, relatively small recovery voltages are provided at two ends of the mechanical switch, and the mechanical switch can safely and reliably switch off the fault current.

BRIEF DESCRIPTION OF THE DRAWINGS

The embodiments of the present invention are further described with reference to the drawings below, wherein.

DETAILED DESCRIPTION OF THE INVENTION

In order to make the purpose, the technical solution and the advantages of the present invention more clearly and unambiguously, the present invention is further clarified by the specific embodiments in combination with the following drawings.

Figure 1:
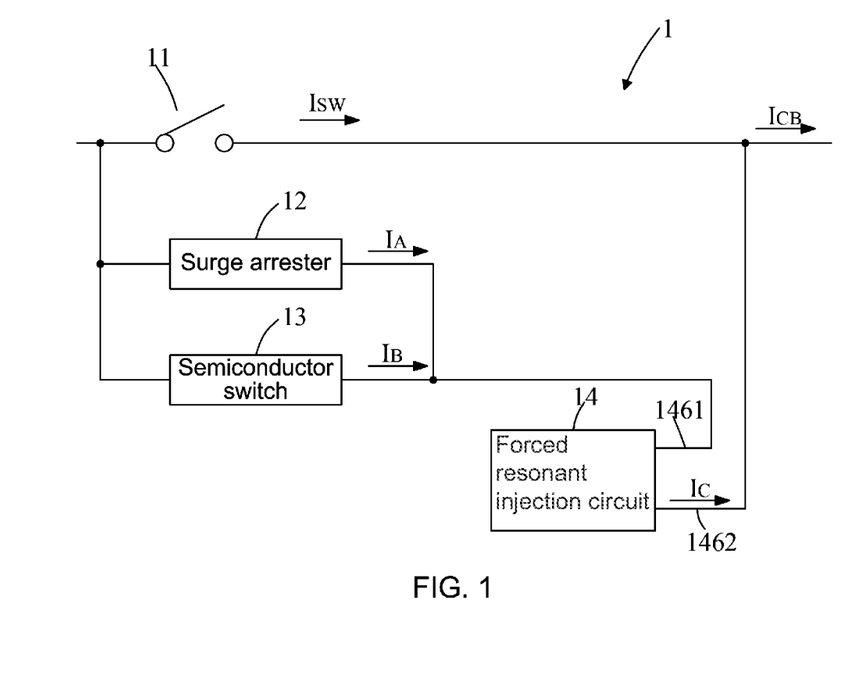
FIG. 1 is a block diagram of a hybrid DC circuit breaker according to a preferred embodiment of the present invention.

FIG. 1 is a block diagram of a hybrid DC circuit breaker according to a preferred embodiment of the present invention. As shown in FIG. 1, the hybrid DC circuit breaker 1 comprises a mechanical switch 11 connected to a first current branch, and a semiconductor switch 13 and a forced resonant injection circuit 14 which are connected to a second current branch. The forced resonant injection circuit 14 comprises a terminal 1461 and a terminal 1462, the terminal 1461 of the forced resonant injection circuit 14 is connected to one end of the semiconductor switch 13, and the other end of the semiconductor switch 13 and the terminal 1462 of the forced resonant injection circuit 14 are connected to two ends of the mechanical switch 11 respectively. The hybrid DC circuit breaker 1 further comprises a surge arrester 12 connected in parallel with the semiconductor switch 13.

For convenience of the following description, in FIG. 1, directions of a current ISW in the mechanical switch 11, a current IA in the surge arrester 12, a current IB in the semiconductor switch 13, an injection current IC output by the forced resonant injection circuit 14 and a current ICB in the hybrid DC circuit breaker 1 are identified by arrows respectively.

The forced resonant injection circuit 14 is controlled to output the gradually increasing injection current IC, wherein the injection current IC, with a direction opposite to that of the current ISW in the mechanical switch 11, flows into the mechanical switch 11 and is used for enabling the current ISW in the mechanical switch 11 to gradually decrease to zero in a predetermined commutation time.

Figure 2:
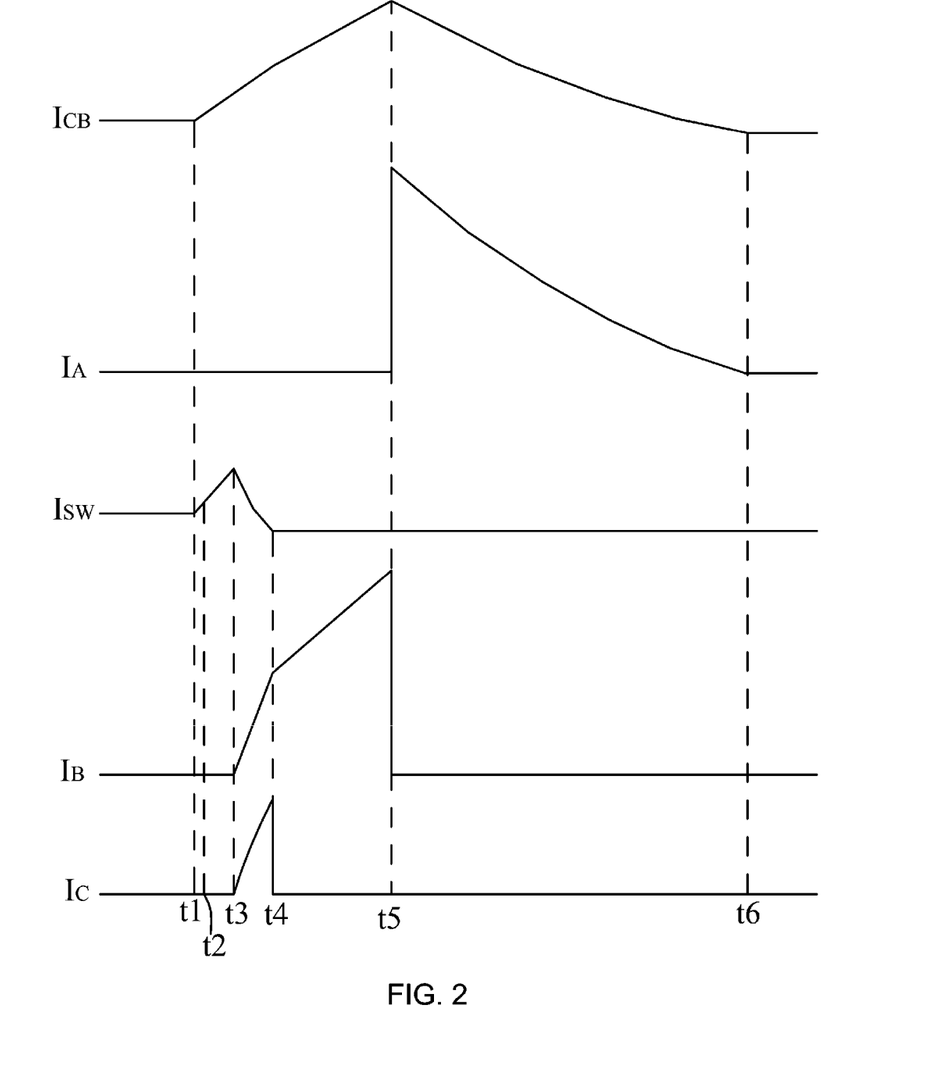
FIG. 2 is a current curve versus time in the hybrid DC circuit breaker shown in FIG. 1.

FIG. 2 is a current curve versus time in the hybrid DC circuit breaker shown in FIG. 1. As shown in FIG. 2, before the time t1, the DC power supply system is in a normal power supply state, no fault current exists in the circuit, the mechanical switch 11 is in a switch-on state, the semiconductor switch 13 is in a turn-off state, and the DC power supply system normally supplies power to a load (not shown in FIG. 1) through the conducted mechanical switch 11; and at this time, the current IA in the surge arrester 12, the current IB in the semiconductor switch 13 and the injection current IC output by the forced resonant injection circuit 14 are all zero, and the current ISW in the mechanical switch 11 is equal to the current ICB in the hybrid DC circuit breaker 1. As the current in the forced resonant injection circuit 14 is zero, the power consumption of the forced resonant injection circuit 14 is zero in the normal power supply process.

At the time t1, when a short circuit occurs on the load, the current ISW in the mechanical switch 11 and the current ICB in the hybrid DC circuit breaker 1 sharply increase.

At the time t2, when the current ISW in the mechanical switch 11 increases to a tripping current, and a control device or a tripping circuit (not shown in FIG. 1) starts to control the mechanical switch 11 to be switched off.

At the times t2-t3, contacts of the mechanical switch 11 are in a separating process, and the current ISW in the mechanical switch 11 and the current ICB in the hybrid DC circuit breaker 1 gradually increase.

At the time t3, the semiconductor switch 13 is controlled to be switched on, and the forced resonant injection circuit 14 is controlled to start to output the injection current IC from the time t3 at the same time. A direction of the injection current IC is that the injection current IC flows from the terminal 1461 to the terminal 1462 and is injected into the mechanical switch 11 in a direction opposite to that of the current ISW in the mechanical switch 11.

At the times t3-t4, the injection current IC output by the forced resonant injection circuit 14 and the current IB in the semiconductor switch 13 gradually increase; and as the direction of the injection current IC is opposite to that of the current ISW in the mechanical switch 11, the current ISW in the mechanical switch 11 gradually decreases. In this process, the current ISW in the mechanical switch 11 is gradually commutated to the semiconductor switch 13, and the current IB in the semiconductor switch 13 and the current ICB in the hybrid DC circuit breaker 1 continue to rise.

At the time t4, the current ISW in the mechanical switch 11 is zero, the current commutation process is completed at this time, the injection current IC output by the forced resonant injection circuit 14 is equal to zero, and the current is stopped from being injected into the mechanical switch 11.

At the times t4-t5, a short-circuit current only flows through the semiconductor switch 13 in the switch-on state; and at this time, the current IB in the semiconductor switch 13 continues to increase, and the current ICB in the hybrid DC circuit breaker 1 gradually increases. In this process, a moving contact of the mechanical switch 11 continues to be opened at several meters per second, and an pitch between the moving contact and a static contact reaches a predetermined contact pitch at the time t5. As the injection current IC output by the forced resonant injection circuit 14 enables the current ISW in the mechanical switch 11 to have been already commutated to the semiconductor switch 13, and the mechanical switch 11 would not withstand high current interruption in this process, that is, the mechanical switch 11 does not require to be switched off at a high current. Specifically, the mechanical switch 11 would achieve zero current switch-off and no-arc switch-off.

At the time t5, the control device (not shown in FIG. 1) controls the semiconductor switch 13 to be in the turn-off or switch-off state, the current IB in the semiconductor switch 13 decreases to zero, and at this time, the current ICB in the hybrid DC circuit breaker 1 reaches its maximum value.

At the times t5-t6, as there is no zero-crossing point of potential in the DC power supply system, at this time, residual electric energy in the DC power supply system is discharged through the surge arrester 12 and the terminals 1461, 1462 of the forced resonant injection circuit 14, and the surge arrester 12 starts to consume the electric energy in the DC power supply system, so that the current IA in the surge arrester 12 gradually decreases to zero, and the current ICB in the hybrid DC circuit breaker 1 gradually decreases to zero at the same time. Finally, at the time t6, a fault is cleared.

In the hybrid DC circuit breaker 1 of the present invention, the two terminals 1461, 1462 of the forced resonant injection circuit 14 and the semiconductor switch 13 are connected in series to the second current branch and are not connected to the first current branch, at which the mechanical switch 11 is located, so that in the normal power supply or direct current transmission process, the DC power supply system only supplies power to the load through the mechanical switch 11, and the power consumption of the forced resonant injection circuit 14 is zero.

In addition, in the switching-off process of the mechanical switch 11, the forced resonant injection circuit 14 of the present invention can controllably inject the gradually increasing injection current IC with the direction opposite to that of the current ISW into the mechanical switch 11 and can control the current ISW in the mechanical switch 11 to be commutated to the semiconductor switch 13 from the time t3 to the time t4, that is, the forced resonant injection circuit 14 can control the current commutation time.

The forced resonant injection circuit 14 can control a current change rate of the current IB in the semiconductor switch 13 at the end time t4 of current commutation; and with a relatively small current change rate, the mechanical switch 11 has a relatively strong rapid switching-off ability and a relatively small switching-off loss. At the end time (i.e. time t4) of current commutation, recovery voltages at two ends of the mechanical switch 11 depend on a resistance of the semiconductor switch 13 and the current IB in the semiconductor switch 13 so as to be capable of being relatively small, for example, being a few volts to tens of volts. At the end time of current commutation, the current change rate of the mechanical switch 11 is relatively small, and relatively small recovery voltages are provided at two ends of the mechanical switch 11, so that the mechanical switch 11 can be safely and reliably switched off.

The time period from the time t4 to the time 5 is a turn-off delay time of the hybrid DC circuit breaker 1 and is used for enabling the pitch between the moving contact and the static contact of the mechanical switch 11 to reach the predetermined contact pitch in the turn-off delay time, wherein the predetermined contact pitch and the turn-off delay time depend on the recovery voltages of the mechanical switch 11 and an opening speed of the moving contact.

When the hybrid DC circuit breaker 1 is used for a bidirectional DC power supply system, for example, when the direction of the current in the hybrid DC circuit breaker 1 is opposite to that of the above current ICB, the forced resonant injection circuit 14 is controlled to output the gradually increasing injection current by the terminal 1461.

Figure 3:
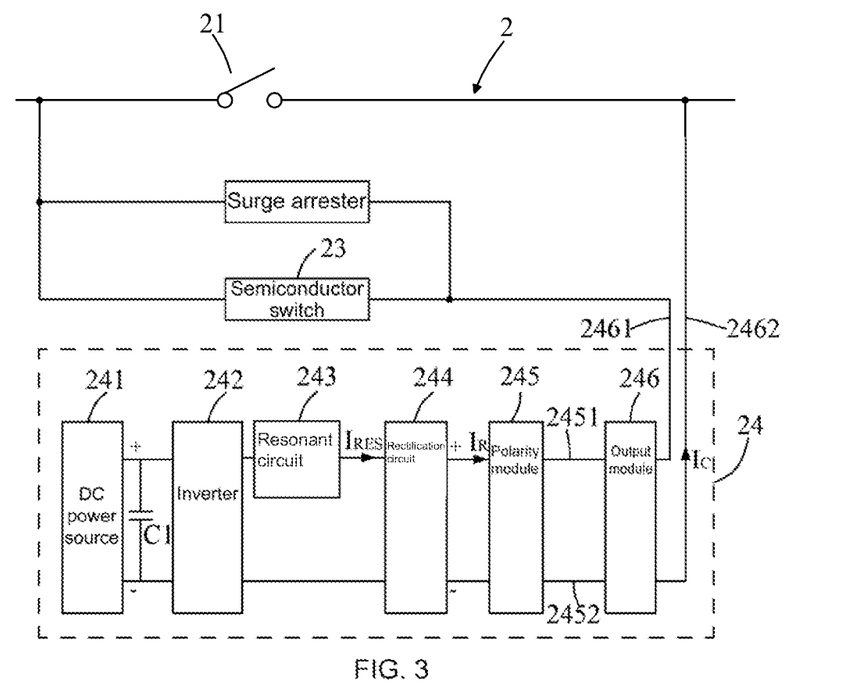
FIG. 3 is a specific block diagram of a forced resonant injection circuit in the hybrid DC circuit breaker shown in FIG. 1.

FIG. 3 is a specific block diagram of a forced resonant injection circuit in the hybrid DC circuit breaker shown in FIG. 1. As shown in FIG. 3, the forced resonant injection circuit 24 comprises a DC power supply 241, a DC bus capacitor C1 connected between a DC bus, an inverter 242, a resonant circuit 243, a rectification circuit 244, a polarity module 245 and an output module 246, wherein an input end of the inverter 242 is connected to the DC power supply 241, and an output end is connected to an input end of the rectification circuit 244 through the resonant circuit 243; an output end of the rectification circuit 244 is connected to an input end of the polarity module 245; an output end of the polarity module 245 is connected to an input end of the output module 246; and one terminal 2461 of the output module 246 is connected to one end of a semiconductor switch 23, and the other terminal 2462 is connected to one end of a mechanical switch 21.

Power supplied to the DC power supply 241 is from direct voltage on the first current branch or an external power supply so as to charge the DC bus capacitor C1; and the DC bus capacitor C1 provides a current to the forced resonant injection circuit through the DC bus, wherein an equivalent resistor, an equivalent capacitor and an equivalent inductor of the inverter 242, the resonant circuit 243, the rectification circuit 244, the polarity module 245 and the output module 246 form an underdamped resonant circuit.

The control device (not shown in FIG. 3) provides a pulse width modulated signal at a high frequency (for example, of 10-100 KHz), i.e. a switching pulse, to the inverter 242, so that the inverter 242 inverts a direct current on the DC bus capacitor C1 to an alternating current, i.e. a square-wave periodic voltage pulse of alternating polarities, wherein a frequency of the square-wave periodic voltage pulse depends on a resonant frequency of the underdamped resonant circuit, so that the resonant circuit 243 outputs a resonant current IRES.

The output module 246 is configured to generate switch-off of a current between the input end of the output module 246 and the first current branch.

Figure 4:
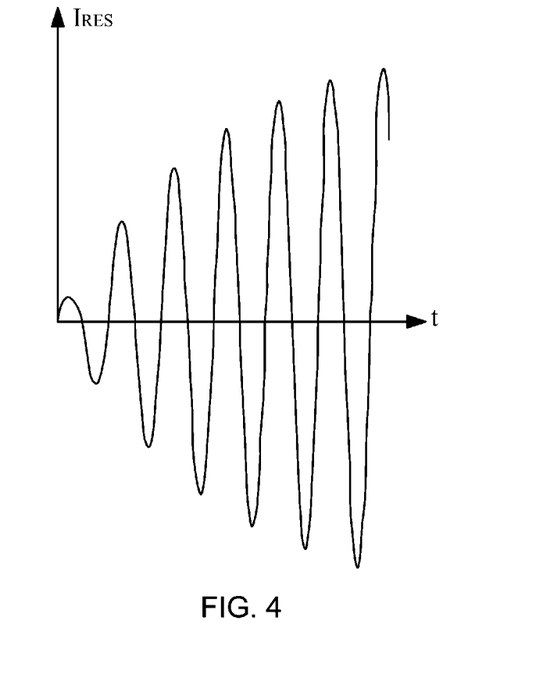
FIG. 4 is a waveform diagram of a resonant current output by a resonant circuit in the forced resonant injection circuit shown in FIG. 3.

FIG. 4 is a waveform diagram of a resonant current output by a resonant circuit in the forced resonant injection circuit shown in FIG. 3. As shown in FIG. 4, the resonant current IRES is an alternating current with a gradually increasing amplitude, and the resonant frequency of the resonant current IRES is determined by an inherent frequency of an inductor, a capacitor and an equivalent resistor (for example, a bulk resistor of the inductor and the capacitor) of an equivalent load circuit. When oscillation is started, the inverter 242 outputs voltage to the resonant circuit 243, and thus the resonant circuit 243 starts to generate an oscillating current. When the resonant current IRES passes zero each time, the inverter 242 is controlled to switch a polarity of the output voltage, and the electric energy on the DC bus capacitor C1 is output to the resonant circuit 243 through the inverter 242, so that the electric energy is supplied in each switching period, and the amplitude of the resonant current IRES output by the resonant circuit 243 gradually increases.

The rectification circuit 244 is used for rectifying the resonant current IRES output by the resonant circuit 243 into the pulsating direct current.

Figure 5:
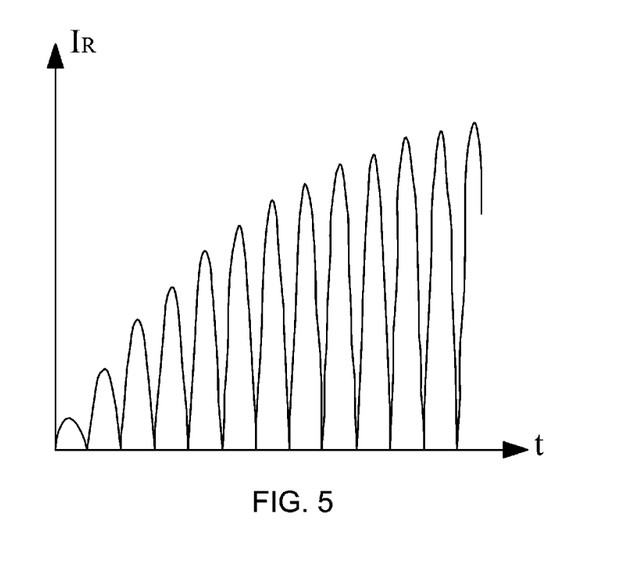
FIG. 5 is a waveform diagram of a rectified current output by a rectification circuit in the forced resonant injection circuit shown in FIG. 3.

FIG. 5 is a waveform diagram of a rectified current output by a rectification circuit in the forced resonant injection circuit shown in FIG. 3. As shown in FIG. 5, the rectified current IR is the pulsating direct current, of which a direction is invariable, and the amplitude periodically increases.

The polarity module 245 comprises a positive input terminal, a negative input terminal, a polarity terminal 2451 and a polarity terminal 2452; and the positive input terminal and the negative input terminal of the polarity module 245 are connected to the positive output terminal and the negative output terminal of the rectification circuit 244 respectively. The polarity module 245 controllably enables the polarity terminals 2451, 2452 to serve as the positive output terminal and the negative output terminal or the negative output terminal and the positive output terminal respectively. Thus, the polarity module 245 outputs a non-inverted or inverted pulsating direct current of the pulsating direct current output by the rectification circuit 244.

The output module 246 is used for filtering or reducing the alternating component in the pulsating direct current output by the polarity module 245, and thus outputting a smooth direct current with a gradually increasing amplitude.

Figure 6:
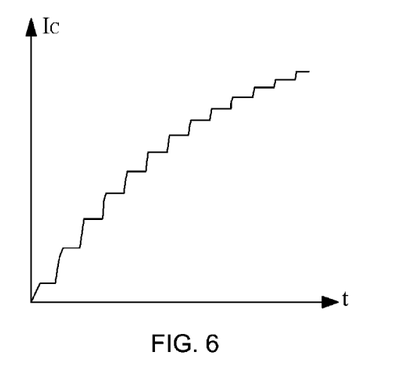
FIG. 6 is a waveform diagram of an injection current output by an output module in the forced resonant injection circuit shown in FIG. 3.

FIG. 6 is a waveform diagram of an injection current output by an output module in the forced resonant injection circuit shown in FIG. 3. As shown in FIG. 6, the injection current IC output by the output module 246 is the smooth direct current, of which the amplitude gradually increases over time. The injection current IC is output from the terminal 2462 of the output module 246 and flows into the mechanical switch 21, so that the current in the mechanical switch 21 gradually decreases to zero in the current commutation time.

By supplying the pulse width modulated signal at the high frequency (for example, 10-100 KHz) to the inverter 242, the output module 246 can output the gradually increasing and smooth direct current in several periods of the switching frequency, so that a fault current in the mechanical switch 21 can be rapidly commutated to the semiconductor switch 23.

In other embodiments of the present invention, when the hybrid DC circuit breaker 2 is used for a one-way DC power supply system, the hybrid DC circuit breaker 2 may not have the polarity module 245, and the semiconductor switch 23 may be a one-way controllable semiconductor switch.

Figure 7:
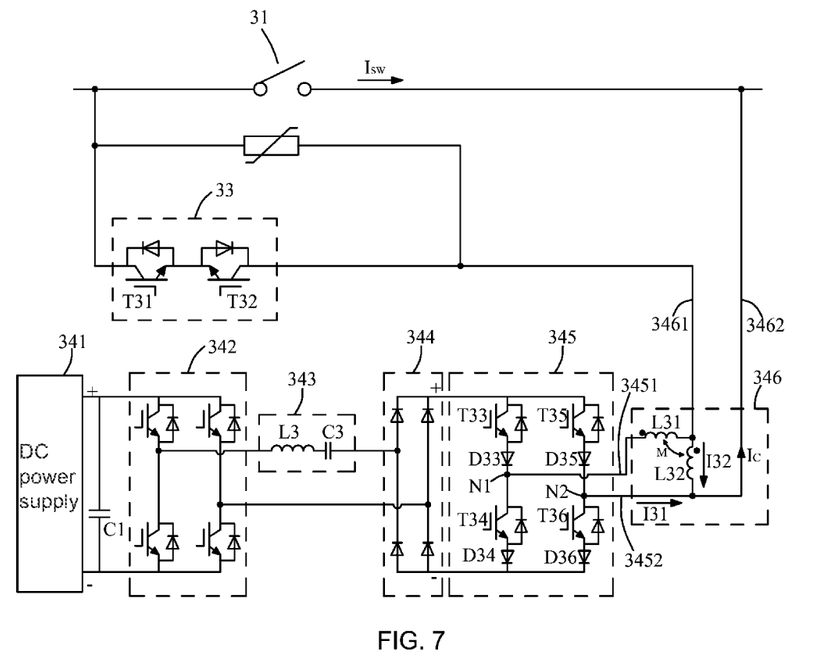
FIG. 7 is a specific circuit diagram of a hybrid DC circuit breaker according to a first embodiment of the present invention.

FIG. 7 is a specific circuit diagram of a hybrid DC circuit breaker according to a first embodiment of the present invention. As shown in FIG. 7, the semiconductor switch 33 is a bidirectional controllable semiconductor switch, comprising an insulated gate bipolar transistor T31 with an antiparallel diode and an insulated gate bipolar transistor T32 with an antiparallel diode, wherein an emitter of the insulated gate bipolar transistor T31 is connected to an emitter of the insulated gate bipolar transistor T32. Through conduction of the insulated gate bipolar transistor T31 or T32, one-way conduction of the direct current is achieved.

The inverter 342 is a full-bridge inverter formed by four field effect transistors.

The resonant circuit 343 comprises an inductor L3 and a capacitor C3 connected in series. By selecting the inductor L3 and the capacitor C3 with suitable parameters, the underdamped resonant circuit is formed when the condition that $R'<2\sqrt{L'/C'}$ is satisfied, wherein R', L' and C' are an equivalent resistance value, an equivalent inductance value and an equivalent capacitance value of the inverter 342, the resonant circuit 343, the rectification circuit 344, the polarity module 345 and the output module 346 respectively. For example, when the equivalent resistance value, the equivalent inductance value and the equivalent capacitance value are 3.5 ohms, 150 μH and 82 nF respectively, at this time, the underdamped resonant circuit is formed.

The switching frequency of the inverter 342 depends on the resonant frequency of the underdamped resonant circuit, for example, if the inductor L3 of 150 μH and the capacitor C3 of 82 nF are selected, the switching frequency of the inverter 342 is $\frac{1}{2}\pi\sqrt{L'/C'}$, i.e. about 45 KHz.

When the two diagonal insulated gate bipolar transistors in the inverter 342 are controlled to be switched on, the DC power supply 341 outputs the electric energy through the two diagonal conducted insulated gate bipolar transistors, and thus the resonant circuit 343 outputs a current of a first polarity. When the other two diagonal insulated gate bipolar transistors in the inverter 342 are controlled to be switched on, the DC power supply 341 outputs the electric energy through the two conducted insulated gate bipolar transistors, and thus the resonant circuit 343 outputs a current of a second polarity and with an increased amplitude. The insulated gate bipolar transistors in the inverter 342 are controlled to be alternately switched on in the above two modes, so that the resonant circuit 343 outputs an alternating current with a gradually increasing amplitude in a plurality of switching periods of the pulse width modulated signal.

The rectification circuit 344 is a full-wave rectification circuit, comprising four diodes.

The polarity module 345 comprises a full-bridge circuit, controlled to change polarities of an input current and an output current of the polarity module. Specifically, the polarity module 345 comprises four insulated gate bipolar transistors T33, T34, T35 and T36 with antiparallel diodes and diodes D33, D34, D35 and D36 connected in series with the insulated gate bipolar transistors T33, T34, T35 and T36 respectively, wherein a node N1 formed by connecting the insulated gate bipolar transistor T33 and the diode D33 connected in series with the insulated gate bipolar transistor T34 and the diode D34 connected in series serves as the polarity terminal 3451 of the polarity module 345, and a node N2 formed by connecting the insulated gate bipolar transistor T35 and the diode D35 connected in series with the insulated gate bipolar transistor T36 and the diode D36 connected in series serves as the polarity terminal 3452 of the polarity module 345; wherein when the diagonal insulated gate bipolar transistors T33 and T36 are controlled to be switched on, the polarity terminals 3451, 3452 serve as the positive output terminal and the negative output terminal of the polarity module 345 respectively, and when the diagonal insulated gate bipolar transistors T34 and T35 are controlled to be switched on, the polarity terminals 3451, 3452 serve as the negative output terminal and the positive output terminal of the polarity module 345 respectively.

The output module 346 is an autotransformer which is coreless to prevent magnetic saturation. The autotransformer comprises a winding L31 and a winding L32, a dotted terminal of the winding L31 is connected to the node N1, a dotted terminal of the winding L32 is connected with an undotted terminal of the winding L31 and serves as the terminal 3461 of the output module 346, and an undotted terminal of the winding L32 is connected to the node N2 and serves as the terminal 3462 of the output module 346.

When the polarity terminal 3452 of the polarity module 345 outputs a current I31, and the current I31 flows into the undotted terminal of the winding L32, the current I31 flows to the dotted terminal of the winding L31 from the undotted terminal of the winding L31; a current I32 is provided from the dotted terminal of the winding L32 to the undotted terminal of the winding L32; and the terminal 3462 outputs the injection current IC, wherein the injection current IC is equal to a sum of the current I31 and the current I32. The injection current IC is injected into the mechanical switch 31, so that the current ISW in the mechanical switch 31 gradually decreases to zero in the current commutation time.

Figure 8:
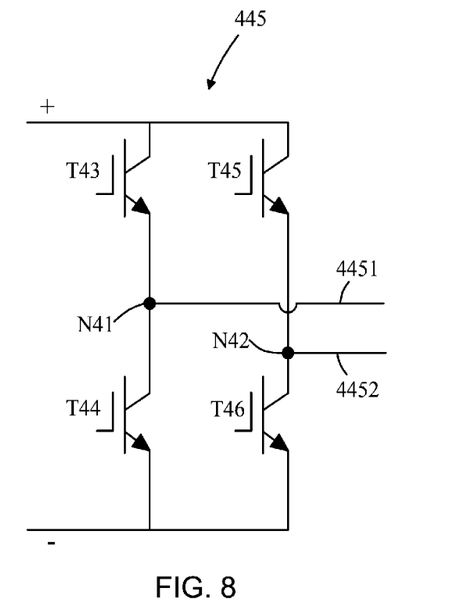
FIG. 8 is a specific circuit diagram of a polarity module in a hybrid DC circuit breaker according to a second embodiment of the present invention.

FIG. 8 is a specific circuit diagram of a polarity module in a hybrid DC circuit breaker according to a second embodiment of the present invention. As shown in FIG. 8, the polarity module 445 comprises four insulated gate bipolar transistors T43, T44, T45 and T46 without antiparallel diodes, wherein the insulated gate bipolar transistors T43 and T44 are connected to form a bridge arm, and the insulated gate bipolar transistors T45 and T46 are connected to form another bridge arm. Specifically, collectors of the insulated gate bipolar transistors T43 and T45 are connected and used for being connected to the positive output terminal of the rectification circuit; emitters of the insulated gate bipolar transistors T44 and T46 are connected and used for being connected to the negative output terminal of the rectification circuit; a node N41 formed by connecting an emitter of the insulated gate bipolar transistor T43 with a collector of the insulated gate bipolar transistor T44 serves as one polarity terminal 4451 of the polarity module 445; and a node N42 formed by connecting an emitter of the insulated gate bipolar transistor T45 with a collector of the insulated gate bipolar transistor T46 serves as the other polarity terminal 4452 of the polarity module 445.

When the diagonal insulated gate bipolar transistors T43 and T46 are controlled to be switched on, and the insulated gate bipolar transistors T44 and T45 are controlled to be turned off, the polarity terminals 4451 and 4452 serve as the positive output terminal and the negative output terminal respectively, wherein the current flows out from the polarity terminal 4451 and flows in from the polarity terminal 4452. When the other diagonal insulated gate bipolar transistors T44 and T45 are controlled to be switched on, and the insulated gate bipolar transistors T43 and T46 are controlled to be turned off, the polarity terminals 4451 and 4452 serve as the negative output terminal and the positive output terminal respectively, wherein the current flows out from the polarity terminal 4452 and flows in from the polarity terminal 4451.

Figure 9:
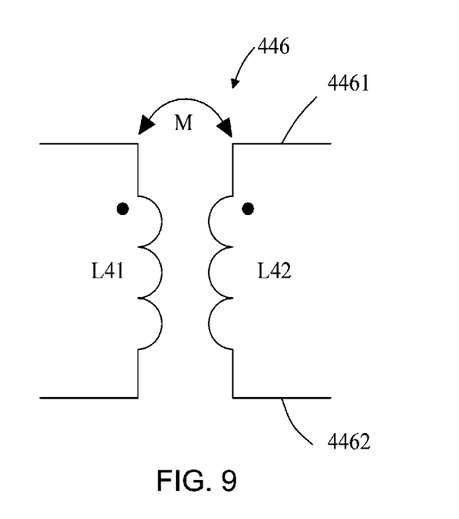
FIG. 9 is a specific circuit diagram of an output module in a hybrid DC circuit breaker according to a third embodiment of the present invention.

FIG. 9 is a specific circuit diagram of an output module in a hybrid DC circuit breaker according to a third embodiment of the present invention. As shown in FIG. 9, the output module 446 is a coreless transformer, comprising a primary winding L41 and a secondary winding L42, wherein a dotted terminal and an undotted terminal of the primary winding L41 are used for being connected to the positive output terminal and the negative output terminal of the rectification circuit 244 respectively or the two polarity terminals 2451, 2452 of the polarity module 245 respectively; and a dotted terminal and an undotted terminal of the secondary winding L42 serve as output terminals 4461, 4462 respectively and are used for being connected to the semiconductor switch and the mechanical switch respectively. When the current flows from the undotted terminal of the primary winding L41 to the dotted terminal, the current in the secondary winding L42 flows from the output terminal 4461 to the output terminal 4462. The coreless transformer 446 has a galvanic isolation function and can further lower the power consumption of the high-frequency resonant circuit IRES in the transmission process at the same time.

Figure 10:
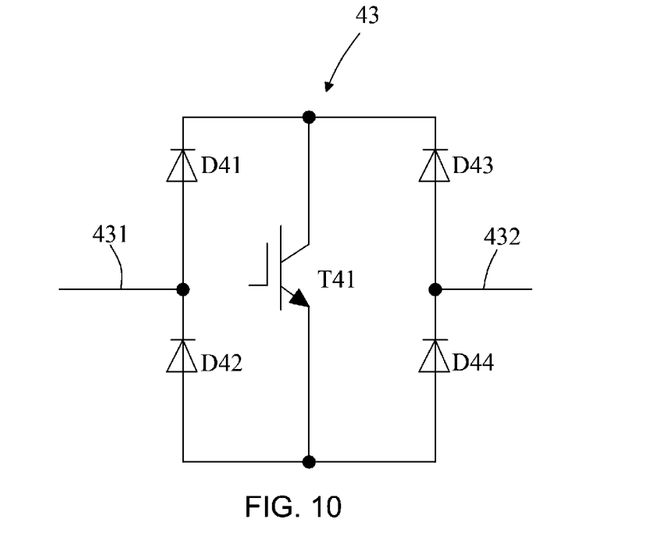
FIG. 10 is a specific circuit diagram of a semiconductor switch in a hybrid DC circuit breaker according to a fourth embodiment of the present invention.

FIG. 10 is a specific circuit diagram of a semiconductor switch in a hybrid DC circuit breaker according to a fourth embodiment of the present invention. As shown in FIG. 10, the semiconductor switch 43 comprises a bridge circuit formed by connecting four diodes D41, D42, D43 and D44 and the insulated gate bipolar transistor T41. The collector of the insulated gate bipolar transistor T41 is connected to negative poles of the diodes D41 and D43, and the emitter of the insulated gate bipolar transistor T41 is connected to positive poles of the diodes D42 and D44. When the insulated gate bipolar transistor T41 is controlled to be switched on, one conductive pathway is that the current flows in from the terminal 431 and flows to the terminal 432 with passing through the diode D41, the conducted insulated gate bipolar transistor T41 and the diode D44; and the other conductive pathway is that the current flows in from the terminal 432 and flows to the terminal 431 with passing through the diode D43, the conducted insulated gate bipolar transistor T41 and the diode D42.

Figure 11:
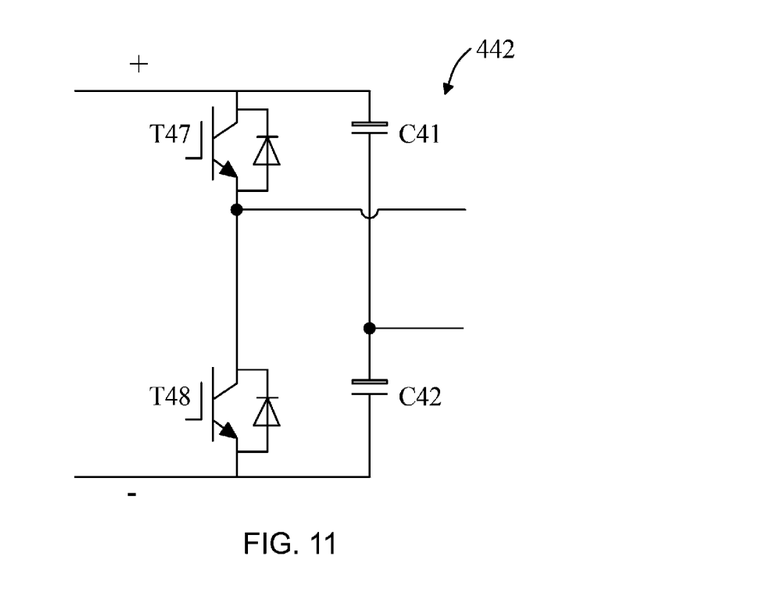
FIG. 11 is a specific circuit diagram of an inverter in a hybrid DC circuit breaker according to a fifth embodiment of the present invention.

FIG. 11 is a specific circuit diagram of an inverter in a hybrid DC circuit breaker according to a fifth embodiment of the present invention. As shown in FIG. 11, the inverter 442 is a half-bridge inverter, comprising insulated gate bipolar transistors T47, T48 and capacitors C41 and C42, wherein a positive input terminal and a negative input terminal of the half-bridge inverter 442 are electrically connected to a positive pole and a negative pole of the DC power supply 241 respectively and used for inverting the direct current output by the DC power supply 241 to the alternating current. The half-bridge inverter 442 only has two switching transistors, and thus the cost of a device can be saved.

In other embodiments of the present invention, the inverter may further be a single-level, double-level or multi-level full-bridge (H bridge) inverter.

In another embodiment of the present invention, the insulated gate bipolar transistors in the semiconductor switch 33 and/or the polarity module 345 in the above embodiments may be substituted with the switching transistors, including metal-oxide-semiconductor field effect transistors (MOSFET).

In yet another embodiment of the present invention, the hybrid DC circuit breaker may comprise a plurality of semiconductor switches 33 connected in series.

In yet another embodiment of the present invention, the rectification circuit 244 may employ a rectification circuit such as a half-wave rectification circuit to rectify the alternating current to the pulsating direct current.

While the present invention has been described by way of the preferred embodiments, the present invention is not limited to the embodiments described herein, and various alterations and modifications can be made without departing from the scope of the present invention.

The invention claimed is:

1. A hybrid DC circuit breaker comprising:
a mechanical switch;
a semiconductor switch having a first terminal connected to a first terminal of the mechanical switch; and
a forced resonant injection circuit having a first terminal connected to a second terminal of the semiconductor switch and a second terminal connected to a second terminal of the mechanical switch, the forced resonant injection circuit configured to produce an injection current at the second terminal of the forced injection circuit and comprising:
a DC power supply;
an inverter coupled to the DC power supply and configured to generate a periodic voltage;
a resonant circuit comprising an inductor and a capacitor connected in series to the inverter and configured to generate an alternating current with a gradually increasing amplitude responsive to the periodic voltage;
a rectification circuit connected to the resonant circuit and configured to produce a direct current with a gradually increasing amplitude responsive to the alternating current; and
an output module connected to the rectification circuit and having
a first terminal connected to the second terminal of the semiconductor switch and a second terminal connected to the second terminal of the mechanical switch.

2. The hybrid DC circuit breaker according to claim 1:
wherein the semiconductor switch is a bidirectionally controllable semiconductor switch; and
wherein the hybrid DC circuit breaker further comprises a polarity module connected between the rectification circuit and the output module; and controllable to change a polarity of a current between the polarity module and the output module.

3. The hybrid DC circuit breaker according to claim 2, wherein the polarity module comprises:
a first switching transistor and a second switching transistor connected to form a first bridge arm, wherein a first node formed by connecting the first switching transistor and the second switching transistor serves as a first polarity terminal; and
a third switching transistor and a fourth switching transistor connected to form a second bridge arm, wherein a second node formed by connecting the third switching transistor and the fourth switching transistor serves as a second polarity terminal;
wherein a first electrode of the first switching transistor and a first electrode of the third switching transistor are connected to a positive output terminal of the rectification circuit and a second electrode of the second switching transistor and a second electrode of the fourth switching transistor are connected to a negative output terminal of the rectification circuit.

4. The hybrid DC circuit breaker according to claim 1, wherein the inverter is a single-level, double-level or multi-level full-bridge inverter or half-bridge inverter.

5. The hybrid DC circuit breaker according to claim 1, wherein the output module comprises a transformer.

6. The hybrid DC circuit breaker according to claim 5, wherein the output module is comprises an autotransformer comprising a first winding and a second winding, wherein a first terminal of the first winding is electrically connected to a first output terminal of the rectification circuit, a second terminal of the first winding is electrically connected to a first terminal of the second winding and serves as the first terminal of the forced resonant injection circuit and a second terminal of the second winding is electrically connected to a second output terminal of the rectification circuit and serves as the second terminal of the forced resonant injection circuit.

7. The hybrid DC circuit breaker according claim 6, wherein the autotransformer is coreless.

8. The hybrid DC circuit breaker according to claim 1, further comprising a surge arrester connected in parallel with the semiconductor switch.

9. A circuit breaker comprising:
a mechanical switch;
a semiconductor switch having a first terminal connected to a first terminal of the mechanical switch;
a current generating circuit configured to generate a direct current with a gradually increasing amplitude; and
an autotransformer having a first terminal coupled to a second terminal of the semiconductor switch, a second terminal connected to a second terminal of the mechanical switch, a third terminal connected to a first output terminal of the current generating circuit and a fourth terminal connected to a second output terminal of the current generating circuit.

10. The circuit breaker of claim 9, wherein the current generating circuit comprises:
an inverter coupled to a DC power source;
a resonant circuit coupled to the inverter; and
a rectification circuit coupled to the resonant circuit, wherein the autotransformer is coupled to the rectification circuit.

11. The circuit breaker of claim 10, wherein the current generating circuit further comprises a polarity inverting circuit coupled between the rectification circuit and the autotransformer.

* * * * *